United States Patent [19]

Kioka et al.

[11] Patent Number: 4,921,825

[45] Date of Patent: May 1, 1990

[54] SOLID CATALYST FOR OLEFIN POLYMERIZATION AND PROCESSES FOR ITS PRODUCTION

[75] Inventors: Mamoru Kioka; Norio Kashiwa, both of Iwakuni, Japan

[73] Assignee: Mitsui Petrochemical Industries, Ltd., Tokyo, Japan

[21] Appl. No.: 245,399

[22] PCT Filed: Dec. 28, 1987

[86] PCT No.: PCT/JP87/01047

§ 371 Date: Aug. 23, 1988

§ 102(e) Date: Aug. 23, 1988

[87] PCT Pub. No.: WO88/05058

PCT Pub. Date: Jul. 14, 1988

[30] Foreign Application Priority Data

Dec. 30, 1986 [JP] Japan .................................. 61-311286
Dec. 30, 1986 [JP] Japan .................................. 61-311287

[51] Int. Cl.$^5$ .............................................. C08F 4/64
[52] U.S. Cl. ..................................... 502/104; 502/103; 502/108; 502/109; 502/117; 502/120

[58] Field of Search ............... 502/103, 104, 108, 109, 502/117, 120, 129, 132, 133

[56] References Cited

U.S. PATENT DOCUMENTS

| | | | |
|---|---|---|---|
| 4,530,914 | 7/1985 | Ewen et al. ...................... | 502/117 X |
| 4,701,432 | 10/1987 | Welborn ......................... | 502/103 X |
| 4,752,597 | 6/1988 | Turner ............................... | 502/104 |
| 4,794,096 | 12/1988 | Ewen .................................. | 502/117 |
| 4,808,561 | 2/1989 | Welborn ............................ | 502/104 |

*Primary Examiner*—Patrick P. Garvin
*Attorney, Agent, or Firm*—Sherman and Shalloway

[57] ABSTRACT

This invention is a catalyst for polymerization of olefins, comprising a compound of a transition metal of Group IVB of the periodic table, an aluminoxane and a particulate organic or inorganic compound carrier.

This catalyst shows very high activity in the polymerization and copolymerization of olefins and gives polymers having a high bulk density, a uniform particle size, a low content of fine particles and a narrow molecular weight distribution and in the case of copolymers, a narrow composition distribution as well.

26 Claims, No Drawings

SOLID CATALYST FOR OLEFIN POLYMERIZATION AND PROCESSES FOR ITS PRODUCTION

TECHNOLOGICAL FIELD

This invention relates to a solid catalyst for polymerization of olefins, and processes for its production. More specifically, it relates to a solid catalyst for polymerization of olefins comprising a particulate carrier, a compound of a transition metal of Group IVB of the periodic table and an aluminoxane as catalyst components, and processes for its production.

BACKGROUND TECHNOLOGY

For production of an alpha-olefin polymer, especially an ethylene homopolymer or an ethylene/alphaolefin copolymer, a method has heretofore been known to polymerize ethylene or copolymerizing ethylene with an alpha-olefin in the presence of a titanium-containing catalyst comprising a titanium compound and an organoaluminum compound or a vanadium-containing catalyst comprising a vanadium compound and an organoaluminum compound.

Catalyst comprising zirconium compounds and aluminoxanes have recently been proposed as a new Ziegler-type olefin polymerization catalyst.

Japanese Laid-Open Patent Publication No. 19309/1983 describes a process for polymerizing ethylene and at least one $C_3$-$C_{12}$ alpha-olefin in the presence of a catalyst composed of a transition metal-containing compound represented by the following formula (cyclopentadienyl)$_2$MeRHal in which R is cyclopentadienyl, $C_1$-$C_6$ alkyl, or halogen, Me is a transition metal and Hal is halogen, and a linear aluminoxane represented by the following formula Al$_2$OR$_4$(Al(R)-O)$_n$

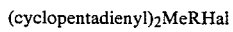

in which R is methyl or ethyl, and n is a number of 4 to 20, or a cyclic aluminoxane represented by the following formula

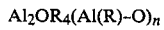

in which R and n are as defined above, at a temperature of $-50°$ C. to $200°$ C.

Japanese Laid-Open Patent Publication No. 95292/1984 describes an invention relating to a process for producing a linear aluminoxane represented by the following formula

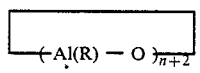

in which n is 2 to 40, and R is $C_1$-$C_6$, and a cyclic aluminoxane represented by the following formula

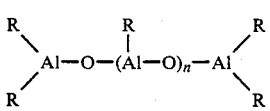

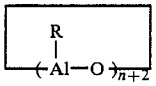

in which n and R are as defined. This patent publication discloses a specific example in which methylaluminoxane, for example, produced by the process of this patent publication is mixed with a bis(cyclopentadienyl) compound of titanium or zirconium, and an olefin is polymerized in the presence of the mixture.

Japanese Laid-Open Patent Publication No. 35005/1985 discloses a process for producing an olefin polymerization catalyst, which comprises reacting an aluminoxane represented by the following formula

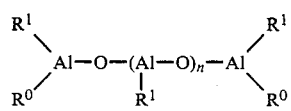

in which R is $C_1$-$C_{10}$ alkyl, and $R^o$ is $R^1$ or is bonded to represent —O—, with a magnesium compound, chlorinating the reaction product, and treating the chlorinated product with a compound of Ti, V, Zr or Cr. This patent publication describes that the above catalyst is especially suitable for copolymerization of a mixture of ethylene with a $C_3$-$C_{12}$ alpha-olefin.

Japanese Laid-Open Patent Publication No. 35006/1985 discloses a combination of (a) a mono-, di- or tri-cyclopentadienyl compound of two or more different transition metals or its derivative and (b) an alumoxane (aluminoxane) as a catalyst system for production of a reactor blended polymer.

Japanese Laid-Open Patent Publication No. 35007/1985 describes a process for polymerizing ethylene alone or together with an alpha-olefin having at least 3 carbon atoms in the presence of a catalyst system comprising a metallocene and a cyclic aluminoxane represented by the following formula

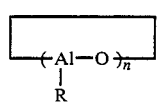

in which R is an alkyl group having 1 to 5 carbon atoms, and n is an integer of 1 to about 20, or a linear alumoxane represented by the following formula

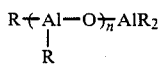

in which R and n are as defined above.

Japanese Laid-Open Patent Publication No. 35008/1985 discloses that by using a catalyst system containing at least two metallocenes and an alumoxane, polyethylene or an ethylene/$C_3$-$C_{10}$ alpha-olefin copolymer having a broad molecular weight distribution is produced.

The catalysts formed from transition metal compounds and aluminoxanes as proposed in these prior art references have much higher polymerization activity than catalyst systems formed from transition metal compounds and organoaluminum compounds known heretofore. But these catalyst systems are soluble in the reaction systems, and the resulting polymer has a low bulk density. It is difficult to obtain polymers having excellent powder characteristics.

On the other hand, the above-cited Japanese Laid-Open Patent Publications Nos. 35006/1985, 35007/1985 and 35008/1985 propose methods in which catalysts formed from a solid catalyst component deposited on a porous inorganic oxide carrier such as silica, silica-alumina or alumina and an aluminoxane are used. Japanese Laid-Open Patent Publications Nos. 31404/1986, 108610/1986 and 106808/1985 propose methods in which a solid catalyst component deposited on a similar porous inorganic oxide carrier is used. In many of the methods described in these prior art references, the polymerization activity is reduced, or the resulting polymers have insufficient powder characteristics such as low bulk density as a result of using the deposited solid components.

DISCLOSURE OF THE INVENTION

It is an object of this invention is to provide a catalyst for olefin polymerization.

Another object of this invention is to provide a catalyst for olefin polymerization comprising a compound of a transition metal of Group IVB of the periodic table and an aluminoxane as catalyst components.

Still another object of this invention is to provide a solid catalyst for olefin polymerization which can give an olefin polymer having a high bulk density and excellent powder characteristics and has high polymerization activity.

A further object of this invention is to provide processes for producing the catalyst of the invention.

Other objects of the invention along with its advantages will become apparent from the following description.

According to this invention, these objects and advantages of the invention are achieved by a solid catalyst for olefin polymerization, characterized in that (A) it comprises
 (A$_1$) a compound of a transition metal of Group IVB of the periodic table as a catalyst component,
 (A$_2$) an aluminoxane as a catalyst component, and
 (A$_3$) a particulate organic or inorganic compound carrier, (B) it contains 0.5 to 500 milligram-atoms of the transition metal atoms and 5 to 50,000 milligram-atoms of aluminum atoms per 100 g of the particulate carrier (A$_3$), (C) the atomic ratio of aluminum atoms (Al) to the transition metal atoms (M), Al/M, is in the range of from 1 to 1,000, and (D) it has an average particle diameter of 5 to 200 micrometers.

The transition metal of Group IVB of the periodic table in the catalyst component (A$_1$) is, for example, selected from titanium, zirconium and hafnium. Preferably, it is titanium or zirconium, and zirconium is especially preferred.

The compound of the transition metal of Group IVB in the catalyst component (A$_1$) may be, for example, a zirconium compound having a group containing a conjugated λ electron as a ligand.

Examples of the zirconium compound having a group containing a conjugated electron as a ligand which is used preferably are compounds of the following formula (I)

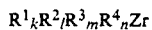

$$R^1{}_kR^2{}_lR^3{}_mR^4{}_nZr \qquad (I)$$

in which R$^1$ represents a cyaloalkadienyl group, R$^2$, R$^3$ and R$^4$ represent a cycloalkadienyl group, an aryl group, an alkyl group, a cycloalkyl group, an aralkyl group, a halogen atom, a hydrogen atom, OR$^a$, SR$^b$, NR$_2{}^c$ or PR$_2{}^d$ where R$^a$, R$^b$, R$^c$ and R$^d$ represent a hydrocarbon group such as an alkyl, cycloalkyl, aryl or aralkyl group, or a silyl group, and two R$^c$ and R$^d$ may be linked to form a ring, k≧1, k+l+m+n=4, and when R$^2$ is a cyloalkadienyl group, R$^1$ and R$^2$ may be bonded through a lower alkylene group.

Examples of the cycloalkadienyl group are cyclopentadienyl, methlcyclopentadienyl, ethylcyclopentadienyl, pentamethylcyclopentadienyl, dimethylcyclopentadienyl, indenyl and tetrahydroindenyl groups. Examples of the alkyl group are methyl, ethyl, propyl, isopropyl, butyl, hexyl, octyl, 2-ethylhexyl, decyl and oleyl groups. Phenyl and tolyl groups may be cited as the aryl group, and benzyl and neophile groups may be cited as the aralkyl group. Examples of the cycloalkyl group include cyclopentyl, cyclohexyl, cyclooctyl, norbornyl, bicyclononyl and alkyl-substituted derivatives of these groups. Unsaturated aliphatic groups such as a vinyl, allyl, propenyl, isopropenyl or 1-butenyl group may also be cited as examples. Examples of the halogen atom are fluorine, bromine and chlorine. Examples of the silyl group are trimethylsilyl, triethylsilyl, phenyldimethylsilyl and triphenylsilyl groups.

Examples of the zirconium compound include
bis(cyclopentadienyl)zirconium monochloride monohydride,
bis(cyclopentadienyl)zirconium momobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzircronium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(indenyl)zirconium dichloride,
bis(indenyl)zirconium dibromide,
bis(cyclopentadienyl)diphenyl zirconium,
bis(cyclopentadienyl)dibenzyl zirconium,
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bisindenylethoxyzirconium chloride, bis(cyclopentadienyl)ethoxyzirconium,
bis(cyclopentadienyl)butoxyzirconium,
bis(cyclopentadienyl)2-ethylhexoxyzirconium,
bis(cyclopentadienyl)phenoxyzirconium monochloride,
bis(cyclopentadienyl)cyclohexoxyzirconium chloride,
bis(cyclopentadienyl)phenylmethoxyzirconium chloride,
bis(cyclopentadienyl)methylzirconium phenyl methoxide,
bis(cyclopentadiphenyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)neoethylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)-dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethtlenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium diethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

Examples of the titanium compound include
bis(cyclopentadienyl)titanium monochloride monohydride,
bis(cyclopentadienyl)methyltitanium hydride,
bis(cyclopentadienyl)phenyltitanium chloride,
bis(cyclopentadienyl)benzyltianium chloride,
bis(cyclopentadienyl)titanium chloride,
bis(cyclopentadienyl)tibenzyl titanium,
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium,
bis(cyclopentadienyl)ethoxytitanium,
ethylenebis(indenyl)titanium dichloride, and
ethylenebis(4,5,6,7-tetrahydro-1-indenyl)titanium dichloride.

The following compounds may be cited as examples of the hafnium compound.
bis(Cyclopentadienyl)hafnium monochloride monohydride,
bis(cyclopentadienyl)ethylhafnium hydride,
bis(cyclopentadienyl)phenylhafnium chloride,
bis(cyclopentadienyl)hafnium dichloride,
bis(cyclopentadienyl)benzyl hafnium,
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride,
bis(cyclopentadienyl)bis(diethylamide)hafnium,
ethylenebis(indenyl)hafnium dichloride, and
ethylenebis(4,5,6,7-tetrahydro-1-indenyl)hafnium chloride.

The catalyst component ($A_2$) is an aluminoxane.
Examples of the aluminoxane used as the catalyst component ($A_2$) are organoaluminum compounds of the following formulae (II) and (III).

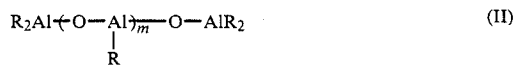

(II)

(III)

In the aluminoxanes above, R is a hydrocarbon group such as a methyl, ethyl, n-propyl, isopropyl, n-butyl or isobutyl group, preferably a methyl, ethyl or isobutyl group. The methyl group is especially preferred. m is an integer of at least 2, preferably at least 5.

The aluminoxane may be produced, for example, by the following method.

(1) A trialkyl aluminum is added to a suspension in a hydrocarbon medium of a compound containing water of adsorption or a salt containing water of crystallization, such as magnesium chloride hydrate, copper sulfate hydrate, aluminum sulfate hydrate, nickel sulfate hydrate and cerous chloride hydrate, and reacted with the above compound.

(2) A trialkyl aluminum is directly reacted with water in a medium such as benzene, toluene, ethyl ether or tetrahydrofuran.

Of these methods, method (1) is preferably employed. The aluminoxane may contain a small amount of an organometallic component.

The particulate carrier ($A_3$) may be organic or inorganic.

Examples of the organic compound carrier include polyolefins such as polyethylene, polypropylene, poly-1-butene and poly-methyl-1-pentene, polyolefins obtained by copolymerizing the monomers used as starting materials for these compounds, polyesters, polyamides, polyvinyl chloride, polymethyl methacrylate, polymethyl acrylate, polystyrene, natural polymers, and various monomeric compounds.

The molecular weights of these carriers may be any at which the compounds can exist as solid substances. For example, polyethylenes having a weight average molecular weight of about 1,000 to 10,000,000 may be used.

In the present invention, the organic compounds used as the carrier not only act as a catalyst support but also may sometimes affect the properties of the resulting polymer. For example, by using polyethylene having a weight average molecular weight of about 2,000,000, an increase in the melt tension of the resulting polyethylene can be expected. On the other hand, by using polyethylene having a weight average molecular weight of about 50,000 as a carrier, an increase in the transparency of the resulting ethylene copolymer film can be expected.

Porous oxides are preferred as the inorganic compound carrier. Specific examples include $SiO_2$, $Al_2O_3$, $MgO$, $ZrO_2$, $TiO_2$, $B_2O_3$, $CaO$, $ZnO$, $BaO$, and $ThO_2$, and mixtures of these, such as $SiO_2$—$MgO$, $SiO_2$—$Al_2$—$O_3$, $SiO_2$—$TiO_2$, $SiO_2$—$V_2O_5$, $SiO_2$—$Cr_2O_3$ and $SiO_2$—$TiO_2$—$MgO$. Carriers containing at least one component selected from the group consisting of $SiO_2$ and $Al_2O_3$ as a main component are preferred.

The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The porous inorganic carriers differ in properties depending upon their types and the method of production. Carriers preferably used in this invention have a specific surface area of 50 to 1000 $m^2/g$, preferably 100 to 700 $m^2/g$, and a pore volume of 0.3 to 2.5 $cm^2/g$. These carriers are obtained by calcination usually at 150° to 1000° C., preferably 200° to 800° C.

The carriers preferably used in this invention vary in characteristics depending upon their types and the method of production, and have a particle diameter of 5 to 200 micrometers, preferably 10 to 150 micrometers, preferably 20 to 100 micrometers.

The solid catalyst for olefin polymerization in accordance with this invention is characterized in that it is formed from the particulate organic or inorganic compound carrier, the compound of a transition metal of Group IVB of the periodic table and the aluminoxane described above; it contains 0.5 to 500 milligram-atoms, as the transition metal atoms, of the transition metal compound and 5 to 50,000 milligram-atoms, as the aluminum atoms, of the aluminoxane; the atomic ratio of the aluminum (A) to the transition metal (M), Al/M, is in the range of from 1 to 1,000; and that it has an average particle diameter of 5 to 200 micrometers.

The solid catalyst of this invention for olefin polymerization usually contains 0.5 to 500 milligram-atoms, preferably 1 to 200 milligram-atoms, more preferably 3 to 50 milligram-atoms, as the transition metal atoms, of the transition metal compound per 100 g of the particulate organic or inorganic compound carrier from the standpoint of activity per unit weight of the catalyst and per unit weight of the transition metal compound.

The solid catalyst of this invention for olefin polymerization usually contains 5 to 50,000 milligram-atoms, preferably 50 to 10,000 milligram-atoms, more preferably 100 to 4,000 milligram-atoms, as aluminum atoms, of the aluminoxane per 100 g of the particulate carrier from the standpoint of polymerization activity and economy.

In the solid catalyst of this invention for olefin polymerization, the atomic ratio of aluminum to the transition metal (Al/M) is usually from 1 to 1,000, preferably from 6 to 600, more preferably from 15 to 300, from the standpoint of polymerization activity per unit weight of the catalyst and per unit weight of Al atoms.

The average particle diameter of the solid catalyst of this invention for olefin polymerization is usually within the range of 5 to 200 micrometers, preferably 10 to 150 micrometers, more preferably 20 to 100 micrometers. If the average particle diameter of the solid catalyst is within the above range, the polymers obtained by polymerization such as vapor-phase polymerization or slurry polymerization using the solid catalyst contain only a small amount of fine powdery polymer particles formed, and have a high bulk density and an excellent powder shape. Furthermore, coarse polymer particles are not formed in the resulting polymers, and troubles such as clogging of a polymer particle discharge opening do not occur.

The solid catalyst of the invention for olefin polymerization may be produced by a process for forming a catalyst for olefin polymerization from an aluminoxane, a compound of a transition metal of Group IVB of the periodic table and a particulate organic or inorganic compound carrier, which comprises at least a step of contacting a solution of the aluminoxane and a solvent in which the aluminoxane is insoluble or sparingly soluble in the presence of the particulare carrier to deposit the aluminoxane on the particulate carrier.

More specifically, the following processes may be shown.

Firstly, the solid catalyst of this invention for olefin polymerization can be produced by (1) contacting a suspension of the particulate organic or inorganic compound carrier dispersed in a solution of the aluminoxane with a solvent in which the aluminoxane is insoluble or sparingly soluble, to form an aluminoxane-supported particulate carrier, and (2) contacting the aluminoxane-supported particulate carrier with a solution of the compound of a transition metal of Group IVB of the periodic table.

The solvent for the aluminoxane may be, for example, an aromatic hydrocarbon such as benzene, toluene, ethylbenzene, propylbenzene, butylbenzene, xylene and chlorobenzene.

Examples of the solvent in which the aluminoxane is insoluble or sparingly soluble are linear or branched aliphatic hydrocarbons such as pentane, hexane, decane, dodecane, kerosene and cyclohexane and alicyclic hydrocarbons such as cyclohexane, norbornene and ethylcyclohexanone.

Preferably, the solvent in which the aluminoxane is insoluble or sparingly soluble preferably has a higher boiling point than the solvent used to obtain the aluminoxane solution.

Examples of the solvent for the group IVB transition metal compound include aromatic hydrocarbons such as benzene, toluene, ethylbenzene, propylbenzene, butylbenzene and xylene and halogen-containing hydrocarbons such as chlorobenzene and dichloroethane.

An aliphatic or alicyclic hydrocarbon such as pentane, hexane, decane, dodecanea, kerosene or cyclohexane may be cited as examples of a solvent in which the Group IVB transition metal compound is insoluble or sparingly soluble.

The above process can be carried out, for example, by adding the solvent in which the aluminoxane is insoluble or sparingly soluble to a suspension composed of a solution of the aluminoxane and the particulate inorganic compound carrier or adding a suspension of the aluminoxane solution and the carrier to the solvent in which the aluminoxane is insoluble or sparingly soluble to precipitate the aluminoxane, optionally evaporating the solvent used to form the aluminoxane solution from the mixed suspension to promote precipitation of the aluminoxane and obtain an aluminoxane-deposited particulate carrier, and then contacting a suspension composed of the aluminoxane-deposited carrier and the solvent in which the aluminoxane is insoluble or sparingly soluble with a solution of the Group IVB transition metal compound to deposit the transition metal compound as a catalyst component further on the aluminoxane-deposited carrier and thus prepare a solid catalyst for olefin polymerization.

In the step of contacting the solvent in which the aluminoxane is insoluble or sparingly soluble with the suspension composed of the aluminoxane solution and the particulate carrier, the solvent in which the aluminoxane is insoluble or sparingly soluble is used in an amount of usually 10 to 10,000 parts by weight, preferably 100 to 1,000 parts by weight, per 100 parts by weight of the aluminoxane solution. The temperature at the time of contacting is usually $-100°$ to $300°$ C., preferably $-50°$ to $100°$ C., more preferably $-30°$ to $50°$ C. The contacting is carried out usually with stirring.

The aluminoxane solution is formed from at least the aluminoxane and the solvent used to dissolve it. The aluminoxane solution may be obtained by, for example, simply mixing the two compounds, or by mixing them with heating. The amount of the solvent in the aluminoxane solution is, for example, 0.1 to 50 liters, preferably 0.2 to 10 liters, more preferably 0.3 to 2 liters, per gram-atom of the aluminum in the aluminoxane.

The amount of the particulate carrier in the suspension obtained by dispersing it in the aluminoxane solution is, for example, 1 to 500 g, preferably 10 to 200 g, more preferably 20 to 100 g, per liter of the 200 g, more preferably 20 to 100 g, per liter of the aluminoxane solution.

The amount of the transition metal compound used is 0.0005 to 1 gram-atom, preferably 0.001 to 0.1 gram-atom, more preferably 0.002 to 0.04 gram-atom, per gram-atom of the aluminum in the aluminoxane suspension during contacting.

The temperature of contacting is usually $-50°$ to $200°$ C., preferably $-20°$ to $100°$ C., more preferably $-10°$ to $50°$ C. The contacting is usually carried out with stirring.

The solution of the transition metal compound is formed from the transition metal compound and the solvent used to dissolve the transition metal compound. The transition metal compound solution may be obtained, for example, by simply mixing the two compounds, or by mixing them with heating. The amount of the solvent in the transition metal compound solution is, for example, 1 to 500 liters, preferably 2 to 200 liters, more preferably 3 to 100 liters, per gram-atom of the transition metal compound.

Secondly, the catalyst of this invention for olefin polymerization can be produced by (1) dispersing the particulate organic or inorganic compound carrier in a solution of the aluminoxane and the Group IVB transition metal compound to prepare a suspension, and (2) contacting the suspension with a solvent in which the aluminoxane is insoluble or sparingly soluble.

This process can be carried out, for example, by adding the solvent in which aluminoxane is insoluble or sparingly soluble to the suspension containing the aluminoxane, the Group IVB transition metal compound and the particulate carrier, or adding the suspension containing the aluminoxane, the Group IVB transition metal compound and the particulate carrier to the solvent in which the aluminoxane is insoluble or sparingly soluble, thereby to precipitate the aluminoxane and the transition metal compound, optionally evaporating the solvent used to dissolve the aluminoxane from the mixed solution to promote precipitation of the aluminoxane and/or the transition metal compound, whereby a solid catalyst for olefin polymerization composed of the transition metal compound and the aluminoxane deposited on the particulate carrier is formed.

In the step of contacting the suspension of the aluminoxane, the Group IVB transition metal compound and the particulate carrier with the solvent in which the aluminoxane is insoluble or sparingly soluble, the solvent in which the aluminoxane is insoluble or sparingly soluble is used in an amount of usually 10 to 10,000 parts by weight, preferably 10 to 1,000 parts by weight, per 100 parts by weight of the solution of the aluminoxane and the Group IVB transit on metal compound. The contacting temperature is usually $-100°$ to $300°$ C., preferably $-50°$ to $100°$ C., more preferably $-30°$ to $50°$ C. The contacting is carried out usually with stirring.

The solution of the aluminoxane and the transition metal compound is prepared from at least the aluminoxane, the transition metal compound and the solvent used to dissolve the aluminoxane. The solution may be obtained, for example, by simply mixing the two compounds, or heating them with heating. The amount of the solvent in the solution is, for example, 0.1 to 50 liters, preferably 0.2 to 10 liters, more preferably 0.3 to 2 liters, per gram-atom of the aluminum in the aluminoxane.

The amount of the transition metal compound in the solution is 0.0005 to 1 gram-atom, preferably 0.001 to 0.1 gram atom, more preferably 0.002 to 0.4 gram-atom, per gram-atom of aluminum in the aluminoxane.

The amount of the carrier in the suspension of the particulate inorganic compound carrier in the solution of the aluminoxane and the transition metal compound is, for example, 1 to 500 g, preferably 10 to 200 g, more preferably 20 to 100 g, per liter of the solution.

The temperature at the time of contacting is usually $-100°$ to $300°$ C., preferably $-50°$ to $100°$ C., more preferably $-30°$ to $50°$ C. The contacting is carried out usually with stirring.

Thirdly, the solid catalyst of the invention for olefin polmerization can be produced by (1) contacting a suspension of the particulate organic or inorganic compound carrier dispersed in a solvent in which the aluminoxane is insoluble or sparingly soluble with a solution of the aluminoxane to form an aluminoxane-supported particulate carrier, and (2) contacting the aluminoxane-supported particulate carrier with a solution of the Group IVB transition metal compound.

The process can be carried out by adding the solution of the aluminoxane to the suspension of the particulate carrier in the solvent in which the aluminoxane is insoluble or sparingly soluble or adding the suspension of the particulate carrier and the solvent in which the aluminoxane is insoluble or sparingly soluble to the solution of the aluminoxane, to thereby precipitate the aluminoxane, optionally evaporating the solvent used to dissolve the aluminoxane from the mixed suspension to promote precipitation of the aluminoxane and/or the transition metal compound, to obtain an aluminoxane-deposited particulate organic or inorganic compound carrier, and then contacting a suspension composed of the aluminoxane-deposited carrier and the solvent in which the aluminoxane is insoluble or sparingly soluble with a solution of the Group IVB transition metal compound, whereby the transition metal compound as a catalyst component is deposited on the aluminoxane-deposited carrier and to prepare a solid catalyst for olefin polymerization.

In the suspension composed of the particulate carrier and the solvent in which the aluminoxane is insoluble or sparingly soluble, the amount of the carrier is usually 1 to 500 g, preferably 10 to 200 g, more preferably 20 to 100 g, per liter of the solvent. The contacting of the suspension and the aluminoxane solution is carried out usually at $-100°$ to $300°$ C., preferably $-50°$ to $100°$ C., more preferably $-30°$ C. The contacting is carried out usually with stirring. The amount of the aluminoxane solution at the time of contacting is usually 1 to 1000 parts by weight, preferably 10 to 100 parts by weight, per 100 parts by weight of the suspension.

The aluminoxane solution used in contacting is formed at least from the aluminoxane and the solvent used to dissolve the aluminoxane. The solution may be obtained, for example, by simply mixing the two compounds or by mixing them with heating. The amount of the solvent in the solution is, for example, 0.1 50 liters, preferably 0.2 to 10 liters, more preferably 0.3 to 2 liters, per gram atom of the aluminum in the aluminoxane.

In contacting the aluminoxane-supported particulate carrier with the solution of the Group IVB transition metal compound, the transition metal compound is used in an amount of 0.005 to 1 g-atom, preferably 0.001 to 0.1 g-atom, more preferably 0.002 to 0.04 g-atom, per g-atom of aluminum in the supported carrier.

The contacting temperature is usually $-50°$ to $200°$ C., preferably $-20°$ to $100°$ C., more preferably $-10°$ to $50°$ C. The contacting is usually carried out with stirring.

The solution of the transition metal compound is formed at least from the transition metal compound and the solvent used to dissolve it. The solution may be obtained, for example, by simply mixing the two compounds or mixing them with heating. The amount of the solvent in the solution of the transition metal compound is, for example, 1 to 500 liters, preferably 2 to 200 liters, preferably 3 to 100 liters, per gram-atom of the transition metal compound.

Fourthly, the solid catalyst of the invention for olefin polymerization can be produced by (1) preparing a suspension of the particulate organic or inorganic compound carrier in a solvent in which the aluminoxane is insoluble or sparingly soluble and a solution of the aluminoxane and the Group IVB transition metal compound, and (2) contacting the suspension and the solution.

This process can be carried out, for example, by adding the solution of the aluminoxane and the Group IVB transition metal compound to the suspension of the particulate carrier in the solvent in which the aluminoxane is insoluble or sparingly soluble or adding the suspension of the particulate carrier and the solvent in which the aluminoxane is insoluble or sparingly soluble to the aluminoxane solution to precipitate the aluminoxane and the transition metal compound, optionally evaporating the solvent used to dissolve the aluminoxane and the transition metal compound from the mixed suspension to promote precipitation of the aluminoxane and/or the transition metal compound whereby a solid catalyst for olefin polymerization composed of the transition metal compound and the aluminoxane deposited on the particulate carrier is prepared.

In the suspension formed from the particulate carrier and the solvent in which the aluminoxane is insoluble or sparingly soluble, the amount of the carrier is usually 1 to 500 g, preferably 10 to 200 g, more preferably 20 to 100 g, per liter of the solvent. The contacting of the suspension with the solution of the aluminoxane and the Group IVB transition metal compound is carried out usually at a temperature of $-100°$ to $300°$ C., preferably $-50°$ to $100°$ C., more preferably $-30°$ to $50°$ C. The contacting is usually carried out with stirring. The amount of the solution of the aluminoxane and the transition metal compound at the time of contacting is usually 1 to 1,000 parts by weight, preferably 10 to 100 parts by weight, per 100 parts by weight of the suspension.

The solution of the aluminoxane and the transition metal compounds used in the contacting is formed from at least the aluminoxane, the transition metal compound and the solvent used to dissolve the aluminoxane. The solution may be obtained, for example, by simply mixing the two compounds, or by mixing them with heating. The amount of the solvent in the solution is, for example, 0.1 to 50 liters, preferably 0.2 to 10 liters, more preferably 0.3 to 2 liters, per gram-atom of the aluminum in the aluminoxane.

The amount of the transition metal compound in the solution is 0.0005 to 1 gram-atom, preferably 0.001 to 0.1 gram-atom, more preferably 0.002 to 0.4 gram-atom, per gram-atom of the aluminum.

The contacting is usually carried out at a temperature of $-50°$ to $200°$ C., preferably $-20°$ to $100°$ C., more preferably $-10°$ to $50°$ C. The contacting is carried out usually with stirring.

The catalyst of this invention is effective for production of olefin polymers, particularly an ethylene polymer or a copolymer of ethylene with an alpha-olefin. Examples of olefins that can be polymerized by using the catalyst of this invention include alpha-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, 1-octadecene and 1-eicocene. The catalyst is especially suitable for polymerization of ethylene or copolymerization of ethylene with an alpha-olefin having 3 to 10 carbon atoms.

In a polymerization process using the catalyst of this invention, olefins are usually polymerized in the vapor phase or in slurry. In the slurry polymerization, an inert hydrocarbon may be used as a solvent, or the olefin itself may serve as a solvent.

Examples of the hydrocarbon medium include aliphatic hydrocarbons such as butane, isobutane, pentane, hexane, octane, decane, dodecane, hexadecene and octadecane, alicyclic hydrocarbons such as cyclopentane, methylcyclopentane, cyclohexane and cyclooctane, and petroleum fractions such as kerosene and light oil.

In carrying out the slurry polymerization method using the catalyst of this invention, polymerization temperatures of $-50°$ to $120°$ C., preferably $0°$ to $100°$ C., are usually employed.

The vapor-phase polymerization using the catalyst of this invention is carried out normally at polymerization temperatures of $0°$ to $120°$ C., preferably 20 to $100°$ C.

In using the catalyst of this invention in the slurry polymerization method or the vapor-phase polymerization method, the proportion of the transition metal compound is, for example, $10^{-8}$ to $10^{-7}$ gram-atom/liter, preferably $10^{-7}$ to $10^{-3}$ gram-atom/liter, as the concentration of the transition metal atom in the polymerization reaction system.

In the above polymerization reaction, an aluminoxane or an organoaluminum compound represented by the general formula $$R_p^h R_q^i AlX_{3-p-q}$$

in which $R^h$ represents a hydrocarbon group having 1 to 10 carbon atoms, preferably an alkyl group having 1 to 6 carbon atoms, an alkenyl group, a cycloalkyl group or an aryl group, $R^k$ represents an alkoxy group having 1 to 6 carbon atoms or an aryloxy group, X is a halogen atom, and $3 \geq p > 0$, and $2 \geq q \geq 0$, may be used. The addition of an organoaluminum compound having a branched group such as triisobutyl aluminum or isoprenyl aluminum is particularly effective for increasing polymerization activity.

The polymerization is carried out usually under normal atmospheric pressure to 100 kg/cm$^2$, preferably 2 to 50 kg/cm$^2$, batchwise, semi-continuously or continuously. It is possible to carry out the polymerization in two or more stages having different reaction conditions.

Preferably, in the process of this invention, the olefin is preliminarily polymerized in the presence of the solid catalyst prior to the main polymerization of the olefin. The preliminary polymerization is carried out, for example, by polymerizing 1 to 1000 g, preferably 5 to 500 g, more preferably 10 to 200 g, of the alphaolefin per gram-atom of the Group IVB transition metal compound (A$_1$) in the solid catalyst. Examples of the olefin used in the preliminary polymerization include ethylene and alpha-olefins having 3 to 20 carbon atoms such as propylene, 1-butene, 4-methyl-1-pentene, 1-hexene, 1-octene, 1-decene, 1-dodecene and 1-tetradecene. Ethylene or both ethylene and a small amount of the alpha-olefin, are preferred.

The preliminary polymerization temperature is $-20°$ to $70°$ C., preferably $-10°$ to $60°$ C., more preferably $0°$ to $50°$ C.

The above preliminary polymerization may be carried out batchwise or continuously under atmospheric pressure or elevated pressures. The preliminary polymerization may be carried out in the presence of a molecular weight controlling agent such as hydrogen. The amount of the molecular weight controlling agent, however, should preferably be limited to an amount in which at least a prepolymer having an intrinsic viscosity [η], measured in decalin at 135° C., of at least 0.2 dl/g, preferably 0.5 to 20 dl/g, can be produced.

The preliminary polymerization is carried out in the absence of a solvent or in an inert hydrocarbon medium. In view of operability, it is preferred to carry out the preliminary polymerization in an inert hydrocarbon medium. Examples of the inert hydrocarbon medium used in the preliminary polymerization may be the same as those exemplified above as the solvent in which the aluminoxane is insoluble ro sparingly soluble.

The concentration of the solid catalyst in the preliminary polymerization reaction system in the preliminary polymerization is, for example, $10^{-6}$ to 1 gram-atom/liter, preferably $10^{-4}$ to $10^{-2}$ gram-atom/liter, as the concentration of the transition metal atom in the solid catalyst.

Synthesis of Aluminoxane

A 400 ml glass flask equipped with a stirrer and thoroughly purged with nitrogen was charged with 37 g of Al$_2$(SO$_4$)$_3$·14H$_2$O and 125 ml of toluene. The flask was cooled to 0° C., and then 125 ml of toluene containing 50 ml of trimethylaluminum was added dropwise over 1 hour. The mixture was then heated to 40° C. over 3 hours, and the reaction was continued at this temperature for 48 hours. After the reaction, the reaction mixture was subjected to solid-liquid separation by filtration. Low-boiling substances were removed from the separated liquid by using an evaporator. Toluene was added to the remaining solid and the desired aluminoxane was recovered as a toluene solution.

The molecular weight of the aluminoxane, determined from freezing point depression in benzene, was 1879, and therefore its degree of polymerization was 15

EXAMPLE 1

Preparation of a Solid Catalyst

A 300 ml pressure-reducible reactor equipped with a stirrer was charged with 67 ml of a toluene solution containing the methylalumioxane synthesized as above in an amount corresponding to 100 millimoles of Al atoms and 2 g of silica (Davison Co., #952) obtained by calcination at 500° C. for 12 hours, and at room temperature, 100 ml. of purified n-decane was added over about 0.5 hour with stirring to precipitate the methylaluminoxane. Then, while the inside of the reactor was reduced in pressure to 4 torr by using a vacuum pump, the inside of the reactor was heated to 35° C. over about 3 hours to remove toluene from the reactor and further precipitate the methylaluminoxane. The reaction mixture was filtered through a filter to remove the liquid portion. The solid portion was then suspended in n-decane, and 5 ml of a toluene solution containing 0.2 millimole of bis(cyclopentadienyl)zirconium dichloride was added. After mixing at room temperature for about 1 hour, the liquid portion was removed by using a filter to prepare a solid catalyst for olefin polymerization.

The amount of Zr contained in the solid catalyst was 7 millimoles per 100 g of silica used as a carrier, and the amount of Al contained in the solid catalyst was 2.4 moles per 100 g of silica used as a carrier. The catalyst had an average particle diameter, determined by microscopiec observation, of about 40 micrometers.

Preliminary Polymerization

A 400 ml reactor equipped with a stirrer was charged with 100 ml of purified n-decane and 0.1 millimole, as Zr, of the solid catalyst under a nitrogen atmosphere. Then, ethylene was fed into the reactor at a rate of 4Nl/hour for one hour, and during this time, the temperature was maintained at 20° C. After the feeding inside of the reactor was purged with nitrogen and then of ethylene, the washed once with purified hexane. The catalyst was stored as a hexane suspension in a catalyst bottle.

Polymerization

Sodium chloride (250 g) as a dispersant was added to a 2-liter autoclave thoroughly purged with nitrogen, and while the autoclave was heated to 90° C., it was subjected to pressure-reduction treatment by a vacuum pump for 2 hours so that the pressure of the inside of the autoclave reached 50 mmHg or below. The temperature of the autoclave was then lowered to 75° C. The inside of the autoclave was purged with ethylene, and 0.007 millimoles, as zirconium atoms, of the solid catalyst component subjected to the preliminary polymerization was added. The autoclave was sealed up, and 50 Nml of hydrogen was added. The autoclave was pressurized with ethylene so that its inside pressure reached 8 kg/cm$^2$-G. The stirring speed was increased to 300 rpm, and the polymerization was carried out at 80° C. for 1 hour.

After the polymerization, all the polymer and sodium chloride in the autoclave were taken out, and put in about 1 liter of water. By stirring for about 5 minutes, substantially all sodium chloride dissolved in water, and only the polymer came afloat on the water surface. The floating polymer was recovered, washed thoroughly with methanol, and dried overnight at 80° C. under reduced pressure. The amount of the polymer yielded was 120.8 g. It had an MFR of 2.6 dg/min. and an apparent bulk density of 0.46 g/ml. The amount of fine polymer particles having a size of less than 105 micrometers was 0.1% by weight based on the entire polymer product, and coarse polymer particles having a size of more than 120 micrometers were not observed. The $\overline{Mw}/\overline{Mn}$ of the polymer measured by GPC was 2.6.

EXAMPLE 2

Preparation of a Solid Catalyst

A 300 ml pressure-reducible reactor equipped with a stirrer was charged with 67 ml of a toluene solution containing the methylaluminoxane in an amount corresponding to 100 millimoles of Al atoms, 5 ml of a toluene solution of 0.2 millimole of bis(cyclopentadienyl)zirconium dichloride and 2 g of silica (Fuji-Davison Co., #952) obtained by calcination as in Example 2, and at room temperature 100 ml of purified n-decane was added over about 1 hour with stirring to precipitate particles composed of the methylaluminoxane and bis(cyclopentadienyl)zirconium chloride. Then, while the inside of the reactor was reduced in pressure to 4 torr by using a vacuum pump, the temperature of the inside of the reactor was increased to 35° C. over about 3 hours to evaporate and remove toluene from the reactor and precipitate particles composed of methylaluminoxane and bis(cyclopentadienyl)zirconium chloride. The reaction suspension was transferred to a filter and the liquid portion was removed. The solid portion was recovered.

The Zr and Al contents and the average particle diameter of the resulting solid catalyst are shown in Table 1.

Preliminary polymerization and vapor-phase polymerization of ethylene were carried out in the same way as in Example 1. The results are shown in Table 1.

COMPARATIVE EXAMPLE 1

In this Example, a solid catalyst was prepared by evaporating toluene without using n-decane, i.e. a solvent in which methylaluminoxane is sparingly soluble; and by using the so-formed solid catalyst, a preliminary polymerization and a vapor-phase polymerization of ethylene as in Example 2 were carried out. Specifically, a 300 ml pressure-reducible reactor equipped with a stirrer was charged with 67 ml of a toluene solution containing the methylaluminoxane in an amount corresponding to 100 millimoles of Al atoms, 5 ml of a toluene solution containing 0.2 millimole of bis(cyclopentadienyl)zirconium dichloride and 2 g of the same silica as used in Example 2. Then, while the inside of the reactor was reduced to 4 torr with stirring, the temperature of the inside of the reactor was increased to 35° C. over about 3 hours to evaporate toluene completely from the reactor and obtain solid particles composed of methylaluminoxane, bis(cyclopentadienyl)zirconium chloride and silica particles. Using the solid particles, preliminary polymerization and vapor-phase polymerization of ethylene were carried out by the same operations as in Example 1. The results are shown in Table 1.

EXAMPLE 3

A solid catalyst was prepared in the same way as in Example 1 except that 1,2-dichloroethane was used instead of toluene as the solvent used to dissolve bis(cyclopentadienyl)zirconium chloride. Using the solid catalyst, preliminary polymerization and vapor-phase polymerization of ethylene were carried out as in Example 1. The results are shown in Table 1.

EXAMPLE 4

A solid catalyst was prepared in the same way as in Example 1 except that ethylbenzene was used instead of toluene as the solvent used to dissolve methylaluminoxane. Using the solid catalyst, preliminary polymerization and vapor-phase polymerization of ethylene were carried out as in Example 1. The results are shown in Table 1.

TABLE 1

| Run No. | Catalyst composition (per 100 g of carrier) | | Catalyst particle diameter ($\mu$m) | Polymerization activity (g-PE/mMZr) | Apparent bulk density (g/cm$^3$) |
|---|---|---|---|---|---|
| | Zr | Al | | | |
| Example 1 | 9 | 2.4 | 40 | 17,300 | 0.46 |
| Example 2 | 8 | 2.5 | 40 | 15,900 | 0.45 |
| Comparative Example 1 | 9 | 4.6 | broad distribution | 2,200 | 0.31 |
| Example 3 | 9 | 2.3 | 40 | 16,600 | 0.45 |
| Example 4 | 8 | 2.3 | 40 | 17,100 | 0.45 |

EXAMPLE 5

Ethylene and 1-hexene were copolymerized in the vapor phase. Specifically, ethylene and 1-hexene were copolymerized in the same way as in Example 1 except that using the solid catalyst subjected to the preliminary polymerization described in Example 1, 10 ml of hexene was added after the addition of the catalyst components, and the polymerization time was shortened to 20 minutes from 1 hour. The results are shown in Table 2.

EXAMPLE 6

Slurry polymerization was carried out using the solid catalyst of Example 1. Specifically, 450 g of liquefied isobutane was introduced into a 2-liter autoclave purged fully with ethylene, and the temperature was raised to 60° C. The solid catalyst component subjected to the preliminary polymerization described in Example 1 was added in an amount of 0.008 millimole calculated as zirconium atoms. Then, 80 ml of 4-methylpentene-1 and 50 Nml of hydrogen were added. Ethylene was then introduced, and the pressure of the inside of the autoclave was maintained at 3.5 kg/cm$^2$-G for 1 hour. During this time, the temperature was controlled to 70° C. After the lapse of 1 hour, about 2 ml of methanol was added to the autoclave to stop the polymerization completely, and the pressure was released. The resulting polymer was recovered, and dried overnight at 80° C. under reduced pressure. The results are shown in Table 2.

EXAMPLE 7

Preparation of a Solid Catalyst

A 300 ml. pressure-reducible reactor equipped with a stirrer was charged with 100 ml of purified n-decane and 2 g of silica (#952, a product of Davison Co.) obtained by calcination at 500° C. for 12 hours, and while the resulting suspension was stirred at room temperature, 69 ml of a toluene solution containing the methylaluminoxane in an amount corresponding to 100 millimoles of Al atoms was added to the stirred suspension over the course of about 0.5 hour. The inside of the reactor was then reduced in pressure to 4 torr by means of a vacuum pump. By raising the temperature of the inside of the reactor to 35° C. over about 3 hours, toluene was removed from the reactor. Then, 5 ml of a toluene solution of 0.2 millimole of bis(cyclopentadienyl)zirconium dichloride was added to the suspension. After mixing at room temperature for about 1 hour, the liquid phase was removed by using a filter and a solid catalyst for olefin polymerization was prepared. The results are shown in Table 2.

EXAMPLE 8

A solid catalyst was prepared, and preliminary polymerization and vapor phase polymerization of ethylene were carried out, in the same way as in Example 1 except that in the preparation of the solid catalyst in Example 1, the amount of bis(cyclopentadienyl)zirconium chloride used was changed to 0.33 millimole from 0.2 millimole. The results are shown in Table 2.

EXAMPLE 9

Ethylene was polymerized in the vapor phase in the same way as in Example 8 except that in the vapor-phase polymerization of ethylene in Example 8, 1.3 millimoles of triisobutyl aluminum was added immediately before the addition of the solid catalyst component subjected to preliminary polymerization to the autoclave. The results are shown in Table 2.

TABLE 2

| Run No. | Catalyst composition (per 100 g of carrier) Zr | Catalyst composition (per 100 g of carrier) Al | Catalyst particle diameter (μm) | Polymerization activity (g-PE/mMZr) | Apparent bulk density (g/cm$^3$) | Density (g/cm$^3$) |
|---|---|---|---|---|---|---|
| Example 5 | 7 | 2.4 | 40 | 10,800 | 0.43 | 0.915 |
| Example 6 | 7 | 2.4 | 40 | 23,300 | 0.41 | 0.911 |
| Example 7 | 8 | 2.8 | 40 | 15,500 | 0.45 | — |
| Example 8 | 14 | 2.3 | 40 | 13,300 | 0.44 | — |
| Example 9 | 14 | 2.3 | 40 | 15,900 | 0.42 | — |

EXAMPLE 10

In the method of Example 1, a solid catalyst was prepared in the same way except that 2 g of polyethylene powder (MIPELON ®, a tradename of a product of Mitsui Petrochemical Industries, Ltd.) having an average particle diameter of 35 micrometers was used instead of 2 g of silica in the preparation of the solid catalyst.

The resulting solid catalyst had a Zr content of 9 millimoles per 100 g of polyethylene used as the carrier and an Al content of 2.0 moles per 100 g of polyethylene used as the carrier. The average particle diameter of the solid catalyst, determined by microscopic observation, was about 40 micrometers.

Preliminary polymerization and polymerization were carried out under the same conditions as in the method of Example 1.

There was obtained 128.2 g of a polymer. It had an MFR of 1.6 dg/min. and an apparent bulk density of 0.46 g/ml. The amount of a fine powdery polymer having a size of less than 105 micrometers was 0.1% by weight based on the entire polymerization product. On the other hand, no coarse polymer particles having a particle size of more than 1120 micrometers were observed. The polymer had an $\overline{Mw}/\overline{Mn}$ of 2.6.

EXAMPLE 11

In the method of Example 2, 2 g of polyethylene powder (MIPELON ®, a tradename for a product of Mitsui Petrochemical Industries, Ltd.) having an average particle diameter of about 35 micrometers was used instead of 2 g of silica at the time of preparing the solid catalyst component. The Zr and Al contents and average particle diameter of the resulting solid catalyst are shown in Table 3.

Preliminary polymerization and vapor-phase polymerization of ethylene were carried out by the same methods as in Example 10, and the results are shown in Table 2.

COMPARATIVE EXAMPLE 2

In this Example, 2 g of the same polyethylene powder as used in Example 11 was used instead of 2 g of silica; and by the same method as in Comparative Example 1, solid particles composed of methylaluminoxane, bis(cyclopentadienyl)zirconium chloride and polyethylene particles were obtained. By the same operations as in Example 10, preliminary polymerization and vapor-phase polymerization of ethylene were carried out. The results are shown in Table 3.

EXAMPLE 12

A solid catalyst was prepared in the same way as in Example 10 except that 1,2-dichloroethane was used instead of toluene as the catalyst used to dissolve bis(cyclopentadienyl)zirconium chloride. Preliminary polymerization and vapor-phase polymerization of ethylene were carried out in the same way as in Example 10. The results are shown in Table 3.

EXAMPLE 13

A solid catalyst was prepared in the same way as in Example 10 except that ethylbenzene was used instead of toluene as the catalyst used to dissolve bis(cyclopentadienyl)zirconium chloride. Preliminary polymerization and vapor-phase polymerization of ethylene were carried out in the same way as in Example 10. The results are shown in Table 3.

TABLE 3

| Run No. | Catalyst composition (per 100 g of carrier) Zr | Al | Catalyst particle diameter (μm) | Polymerization activity (g-PE/mMZr) | Apparent bulk density (g/cm$^3$) |
|---|---|---|---|---|---|
| Example 10 | 9 | 2.0 | 40 | 18,300 | 0.46 |
| Example 11 | 8 | 2.3 | 40 | 16,200 | 0.45 |
| Comparative Example 2 | 9 | 4.6 | broad distribution | 2,200 | 0.31 |
| Example 12 | 9 | 2.2 | 40 | 17,900 | 0.45 |
| Example 13 | 8 | 2.3 | 40 | 16,800 | 0.45 |

EXAMPLE 14

Ethylene and 1-hexene were copolymerized in the vapor phase. Specifically, using the solid catalyst subjected to the preliminary polymerization described in Example 10, ethylene and 1-hexene were copolymerized in the same way as in Example 10 except that 10 ml of hexene was added after adding the catalyst components, and the polymerization time was shortened to 20 minutes from 1 hour. The results are shown in Table 4.

EXAMPLE 15

Slurry polymerization was carried out using the solid catalyst of Example 10. Specifically, 450 g of liquefied isobutane was introduced into a 2-liter autoclave purged fully with ethylene, and the temperature was raised to 60° C. The solid catalyst component subjected to the preliminary polymerization described in Example 10 was added in an amount of 0.008 millimole calculated as zirconium atoms. Then, 80 ml of 4-methylpentene-1 and 50 Nml of hydrogen were added. Ethylene was then introduced, and the pressure of the inside of the autoclave was maintained at 3.5 kg/cm$^2$-G for 1 hour. During this time, the temperature was controlled to 70° C. After the lapse of 1 hour, about 2 ml of methanol was added to the autoclave to stop the polymerization completely, and the pressure was released. The resulting polymer was recovered, and dried overnight at 80° C. under reduced pressure. The results are shown in Table 4.

EXAMPLE 16

A solid catalyst was prepared in the same way as in Example 10 except that 2 g of spherical polystyrene powder (#200–#400, a product of Eastman Kodak Co.) having a particle diameter of about 30 micrometers was used instead of polyethylene used as the carrier. Preliminary polymerization and then vapor-phase polymerization of ethylene were carried out in the same way as in Example 10. The results are shown in Table 4.

EXAMPLE 17

Preparation of a Solid Catalyst

A 300 ml pressure-reducible reactor equipped with a stirrer was charged with 100 ml of purified n-decane and 2 g of polyethylene powder (MIPELON®, a tradename for a product of Mitsui Petrochemical Industries, Ltd.) having an average particle diameter of 35 micrometers, and while the suspension was stirred at room temperature, 67 ml of a toluene solution containing the methylaluminoxane in an amount corresponding to 100 millimoles of Al atoms was added to the suspension over about 0.5 hour. Then, while the inside of the reactor was reduced in pressure to 4 torr by means of a vacuum pump, the temperature of the reactor was raised to 35° C. over about 3 hours to remove toluene from the reactor. Then, 5 ml of a toluene solution containing 0.2 millimoles of bis(cyclopentadienyl)zirconium dichloride was added to the suspension. After mixing at room temperature for about 1 hour, the liquid phase was removed by using a filter, and a solid catalyst for olefin polymerization was prepared. The results are shown in Table 4.

EXAMPLE 18

A solid catalyst was prepared in the same way as in Example 10 except that the amount of bis(cyclopentadienyl)zirconium dichloride was changed to 0.33 millimole from 0.2 millimole in the preparation of the solid catalyst of Example 10. Preliminary polymerization and vapor-phase polymerization of ethylene were carried out. The results are shown in Table 4.

EXAMPLE 19

Ethylene was polymerized in the vapor phase in the same way as in Example 18 except that 1.3 millimoles of triisobutyl aluminum was added immediately before the addition of the solid catalyst component subjected to preliminary polymerization to the autoclave. The results are shown in Table 4.

TABLE 4

| Run No. | Catalyst composition (per 100 g of carrier) Zr | Al | Catalyst particle diameter (μm) | Polymerization activity (g-PE/mMZr) | Apparent bulk density (g/cm$^3$) | Density (g/cm$^3$) |
|---|---|---|---|---|---|---|
| Example 14 | 9 | 2.0 | 40 | 11,300 | 0.42 | 0.916 |
| Example 15 | 9 | 2.0 | 40 | 26,900 | 0.42 | 0.913 |
| Example 16 | 8 | 2.8 | 35 | 15,800 | 0.44 | — |
| Example 17 | 8 | 3.1 | 40 | 17,700 | 0.43 | — |

TABLE 4-continued

| Run No. | Catalyst composition (per 100 g of carrier) Zr | Catalyst composition (per 100 g of carrier) Al | Catalyst particle diameter (μm) | Polymerization activity (g-PE/mMZr) | Apparent bulk density (g/cm³) | Density (g/cm³) |
|---|---|---|---|---|---|---|
| Example 18 | 14 | 2.2 | 40 | 16,100 | 0.44 | — |
| Example 19 | 14 | 2.2 | 40 | 18,900 | 0.43 | — |

POSSIBILITY OF INDUSTRIAL UTILIZATION AND EFFECT

This invention is a solid catalyst for olefin polymerization having very high polymerization activity in the homopolymerization and copolymerization of olefins. This catalyst gives a polymer and a copolymer which have a high bulk density, a uniform particle size, a low content of fine powder and a narrow molecular weight distribution, and in the case of the copolymer, a narrow composition distribution.

We claim:

1. A process for forming a solid catalyst for olefin polymerization from an aluminoxane, a compound of a transition metal of Group IVB of the Periodic Table and a particulate organic or inorganic compound carrier, which comprises: at least a step comprising contacting a solution of said aluminoxane in a first solvent with a second solvent in which said aluminoxane is insoluble or sparingly soluble, in the presence of said particulate organic or inorganic compound carrier, to deposit said aluminoxane on said particulate organic or inorganic compound carrier.

2. The process of claim 1, wherein said process comprises:
   (1) contacting a suspension of said particulate organic or inorganic compound carrier dispersed in a solution of said aluminoxane in said first solvent with said second solvent in which the aluminoxane is insoluble or sparingly soluble, to form an aluminoxane supported on said particulate organic or inorganic compound carrier, and
   (2) contacting said aluminoxane supported on said particulate organic or inorganic compound carrier with a solution of said compound of a transition metal of Group IVB of the Periodic Table in a third solvent.

3. The process of claim 1, wherein said process comprises:
   (1) dispersing said particulate organic or inorganic compound carrier in a solution of said aluminoxane and said compound of a transition metal of Group IVB of the Periodic Table in said first solvent to prepare a suspension, and
   (2) contacting said suspension with said second solvent in which said aluminoxane is insoluble or sparingly soluble:

4. The process of claim 1, wherein said process comprises:
   (1) contacting a suspension of said particulate organic or inorganic compound carrier dispersed in said second solvent in which said aluminoxane is insoluble or sparingly soluble with a solution of said aluminoxane in said first solvent to form an aluminoxane supported on said particulate organic or inorganic compound carrier, and
   (2) contacting said aluminoxane supported on said particulate organic or inorganic compound carrier with a solution of said compound of a transition metal of Group IVB of the Periodic Table in a third solvent.

5. The process of claim 1, wherein said process comprises:
   (1) preparing a suspension of said particulate organic or inorganic compound carrier in said second solvent in which said aluminoxane is insoluble or sparingly soluble and preparing a solution of said aluminoxane and said compound of a transition metal of Group IVB of the Periodic Table in said first solvent, and
   (2) contacting said suspension and said solution.

6. The process of claim 1, wherein said catalyst contains 0.5 to 500 milligram-atoms of said transition metal of said compound of a transition metal of Group IVB of the Periodic Table and 5 to 50,000 milligram-atoms of aluminum of said aluminoxane per 100 grams of said particulate organic or inorganic compound carrier; has an atomic ratio of aluminum atoms of said aluminoxane to transition metal atoms of said compound of a transition metal of Group IVB of the Periodic Table in the range of from 1 to 1,000; and has an average particle diameter of 5 to 200 micrometers.

7. The process of claim 2, wherein step (1) further comprises evaporating said first solvent to promote precipitation of said aluminoxane.

8. The process of claim 2, wherein said aluminoxane solution contains 0.1 to 50 liters of said first solvent per gram-atom of aluminum in said aluminoxane.

9. The process of claim 8, wherein said second solvent is used in an amount of 10 to 10,000 parts by weight per 100 parts by weight of said aluminoxane solution.

10. The process of claim 8, wherein said particulate organic or inorganic carrier compound is present in said aluminoxane solution in an amount of 1 to 500 grams per liter of said aluminoxane solution.

11. The process of claim 8, wherein said transition metal of Group IVB of the Periodic Table is used in an amount of 0.0005 to 1 gram-atom per gram-atom of aluminum in said aluminoxane.

12. The process of claim 11, wherein said third solvent is present in an amount of 1 to 500 liters per gram-atom of said transition metal of said compound of a transition metal of Group IVB of the Periodic Table.

13. The process of claim 3, wherein step (2) further comprises evaporating said first solvent to promote precipitation of said aluminoxane and/or said compound of a transition metal of Group IVB of the Periodic Table.

14. The process of claim 3, wherein said second solvent is used in an amount of 10 to 10,000 parts by weight per 100 parts by weight of said solution of said aluminoxane and said compound of a transition metal of Group IVB of the Periodic Table.

15. The process of claim 3, wherein said solution of said aluminoxane and said compound of a transition metal of Group IVB of the Periodic Table contains 0.1 to 50 liters of said first solvent per gram-atom of aluminum in said aluminoxane.

16. The process of claim 15, wherein said compound of said transition metal of Group IVB of the Periodic Table is present in an amount of 0.0005 to 1 gram-atom transition metal per gram-atom of aluminum in said aluminoxane.

17. The process of claim 16, wherein said particulate organic or inorganic compound carrier is present in an amount of 1 to 500 grams per liter of said solution of said aluminoxane and said compound of a transition metal of Group IVB of the Periodic Table.

18. The process of claim 4, wherein step (1) further comprises evaporating said first solvent to promote precipitation of said aluminoxane.

19. The process of claim 4, wherein said suspension of said particulate organic or inorganic compound carrier in said second solvent contains 1 to 500 grams of said particulate organic or inorganic compound carrier per liter of said second solvent.

20. The process of claim 4, wherein said aluminoxane solution is used in an amount of 1 to 1,000 parts by weight per 100 parts by weight of said suspension.

21. The process of claim 4, wherein said aluminoxane solution contains 0.1 to 50 liters of said first solvent per gram-atom of aluminum in said aluminoxane.

22. The process of claim 4, wherein said compound of a transition metal of Group IVB of the Periodic Table is used in an amount of 0.0005 to 1 gram-atom transition metal per gram-atom of aluminum in said aluminoxane supported on said particulate organic or inorganic compound carrier.

23. The process of claim 5, wherein step (2) further comprises evaporating said first solvent to promote precipitation of said aluminoxane and/or said compound of a transition metal of Group IVB of the Periodic Table.

24. The process of claim 5, wherein said suspension of said particulate organic or inorganic compound carrier in said second solvent contains 1 to 500 grams of said particulate organic or inorganic compound carrier per liter of said second solvent.

25. The process of claim 5, wherein said solution of said aluminoxane and said compound of a transition metal of Group IVB of the Periodic Table in said first solvent contains 0.1 to 50 liters of said first solvent per gram-atom of aluminum in said aluminoxane and 0.0005 to 1 gram-atom of said transition metal in said compound of a transition metal of Group IVB of the Periodic Table per gram-atom of aluminum in said aluminoxane.

26. The process of claim 5, wherein 1 to 1000 parts by weight of said solution of said aluminoxane and said compound of a transition metal of Group IVB of the Periodic Table in said first solvent is contacted with 100 parts by weight of said suspension of said particulate organic or inorganic compound carrier in said second solvent.

* * * * *